US011754484B2

(12) United States Patent
Fan et al.

(10) Patent No.: US 11,754,484 B2
(45) Date of Patent: Sep. 12, 2023

(54) OPTICAL AIR DATA SYSTEM FUSION WITH REMOTE ATMOSPHERIC SENSING

(71) Applicant: Honeywell International Inc., Charlotte, NC (US)

(72) Inventors: Xiao Zhu Fan, Plymouth, MN (US); Timothy A. Peterson, Minneapolis, MN (US); Lee R. Wienkes, Minneapolis, MN (US); Matthew Wiebold, Mankato, MN (US)

(73) Assignee: Honeywell International Inc., Charlotte, NC (US)

( * ) Notice: Subject to any disclaimer, the term of this patent is extended or adjusted under 35 U.S.C. 154(b) by 137 days.

(21) Appl. No.: 17/028,447

(22) Filed: Sep. 22, 2020

(65) Prior Publication Data
US 2022/0091007 A1 Mar. 24, 2022

(51) Int. Cl.
*G01N 15/06* (2006.01)
*G01C 23/00* (2006.01)

(52) U.S. Cl.
CPC ............. *G01N 15/06* (2013.01); *G01C 23/00* (2013.01); *G01N 2015/0693* (2013.01)

(58) Field of Classification Search
CPC . G01N 15/06; G01N 2015/0693; G01C 23/00
See application file for complete search history.

(56) References Cited

U.S. PATENT DOCUMENTS 4,483,614 A   11/1984  Rogers
5,884,226 A *  3/1999  Anderson ............ G01N 21/538
                                                         702/3

(Continued)

FOREIGN PATENT DOCUMENTS

WO   WO-2011014712 A2 *  2/2011  ............ F03D 7/048
WO   WO-2018015418 A1 *  1/2018  ........... G08B 17/107

OTHER PUBLICATIONS

European Patent Office, "Extended European Search Report from EP Application No. 21197544.6", dated Jan. 25, 2022, from Foreign Counterpart to U.S. Appl. No. 17/028,447, pp. 1 through 14, Published: EP.

(Continued)

*Primary Examiner* — Dominic J Bologna
*Assistant Examiner* — Jarreas C Underwood
(74) *Attorney, Agent, or Firm* — Fogg & Powers LLC

(57) ABSTRACT

A system comprises an optical air data system that measures aerosol and molecular scattering of light, and an optical instrument that measures aerosol and/or molecular scattering of light. A processor receives data from the air data system and from the optical instrument. The processor performs one or more signal analysis and data fusion methods comprising: (a) determining aerosol and/or molecular concentration from the received data, modifying a data analysis algorithm to optimize any remaining unknown parameters, and outputting enhanced air data parameters; (b) determining aerosol concentration from the received data, dynamically optimizing hardware settings in the air data system to enhance a signal level and avoid system saturation, and outputting enhanced air data parameters; or (c) determining aerosol and/or molecular concentration from the received data, estimating a confidence level of an air data algorithm, verifying optical health of the air data system, and reporting the optical health to a user.

19 Claims, 8 Drawing Sheets

(56) References Cited

U.S. PATENT DOCUMENTS

| | | | |
|---|---|---|---|
| 6,243,182 B1* | 6/2001 | Wang | H04B 10/1121 398/119 |
| 7,106,447 B2 | 9/2006 | Hays | |
| 7,504,958 B1* | 3/2009 | Genovese | G01N 1/2202 340/634 |
| 7,522,291 B2 | 4/2009 | Hays et al. | |
| 8,434,358 B2 | 5/2013 | Asahara et al. | |
| 9,998,661 B1* | 6/2018 | Banta | H04N 23/698 |
| 2003/0219252 A1 | 11/2003 | Hays | |
| 2004/0027570 A1* | 2/2004 | Caldwell | G01P 13/025 356/28 |
| 2006/0262324 A1 | 11/2006 | Hays et al. | |
| 2007/0286329 A1* | 12/2007 | Wang | G01N 23/087 345/418 |
| 2009/0310118 A1* | 12/2009 | Halldorsson | G01S 17/95 356/28 |
| 2011/0181864 A1* | 7/2011 | Schmitt | G01S 17/95 356/28 |
| 2012/0068863 A1* | 3/2012 | Tillotson | G01S 13/003 340/963 |
| 2012/0092645 A1 | 4/2012 | Inokuchi | |
| 2013/0314694 A1* | 11/2013 | Tchoryk, Jr. | G01S 17/58 356/28.5 |
| 2015/0102934 A1* | 4/2015 | Erdtmann | G08B 17/107 340/630 |
| 2016/0299511 A1 | 10/2016 | Kontz et al. | |
| 2019/0018154 A1* | 1/2019 | Olcott | G01T 1/2023 |
| 2019/0039742 A1 | 2/2019 | Gordon et al. | |
| 2019/0156641 A1* | 5/2019 | Pedersen | G08B 29/145 |
| 2019/0217966 A1 | 7/2019 | Winter | |
| 2019/0302141 A1* | 10/2019 | Caldwell | G01S 17/58 |
| 2020/0363445 A1* | 11/2020 | Sly | G01C 5/06 |
| 2021/0072281 A1* | 3/2021 | Jayakumar | G01P 21/00 |
| 2021/0181081 A1* | 6/2021 | Ohyama | G01N 15/06 |

OTHER PUBLICATIONS

Franczek et al., "Laser-Based Air Data System for Aircraft Control Using Raman and Elastic Backscatter for the Measurement of Temperature, Density, Pressure, Moisture and Particle Backscatter Coefficient", Applied Optics, vol. 51, No. 2, Jan. 10, 2012, pp. 148 through 166, (c) 2012 Optical Society of America.

* cited by examiner

OPTICAL AIR DATA SYSTEM FUSION WITH REMOTE ATMOSPHERIC SENSING

BACKGROUND

Optical air data systems collect the optical backscatter from aerosols and air molecules in the atmosphere. Air data parameters such as air speed, angle of attack (AOA), angle of sideslip (AOS), temperature, and pressure can be derived from the spectral content of the collected backscatter signal, which is dependent on aerosol and molecular parameters (e.g., aerosol and molecular concentration). Accurately extracting air data parameters from the collected backscatter signal can be challenging due to the numerous dependencies and degrees of freedom of a model fit for analyzing the air data.

SUMMARY

A system comprises an optical air data system operative to measure aerosol and molecular scattering of light from an interrogation region, and an optical instrument separate from the optical air data system, with the optical instrument operative to measure aerosol and/or molecular scattering of light from the interrogation region. A processor is operative to receive data from the optical air data system and data from the optical instrument. The processor is configured to perform one or methods comprising: (a) a first signal analysis and data fusion method comprising determining an aerosol and/or molecular concentration in the interrogation region from the received data, modifying a data analysis algorithm to optimize any remaining unknown parameters, and outputting enhanced air data parameters; (b) a second signal analysis and data fusion method comprising determining an aerosol concentration, or presence thereof, in the interrogation region from the received data, dynamically optimizing hardware settings in the optical air data system to enhance a signal level and avoid system saturation, and outputting enhanced air data parameters; or (c) a third signal analysis and data fusion method comprising determining an aerosol and/or molecular concentration, or presence thereof, in the interrogation region from the received data, estimating a confidence level of an air data algorithm in the processor, verifying optical health of the optical air data system, and reporting the optical health to an external user.

BRIEF DESCRIPTION OF THE DRAWINGS

Features of the present invention will become apparent to those skilled in the art from the following description with reference to the drawings. Understanding that the drawings depict typical embodiments and are not therefore to be considered limiting in scope, the invention will be described with additional specificity and detail through the use of the accompanying drawings, in which.

DETAILED DESCRIPTION

Figure 1A:
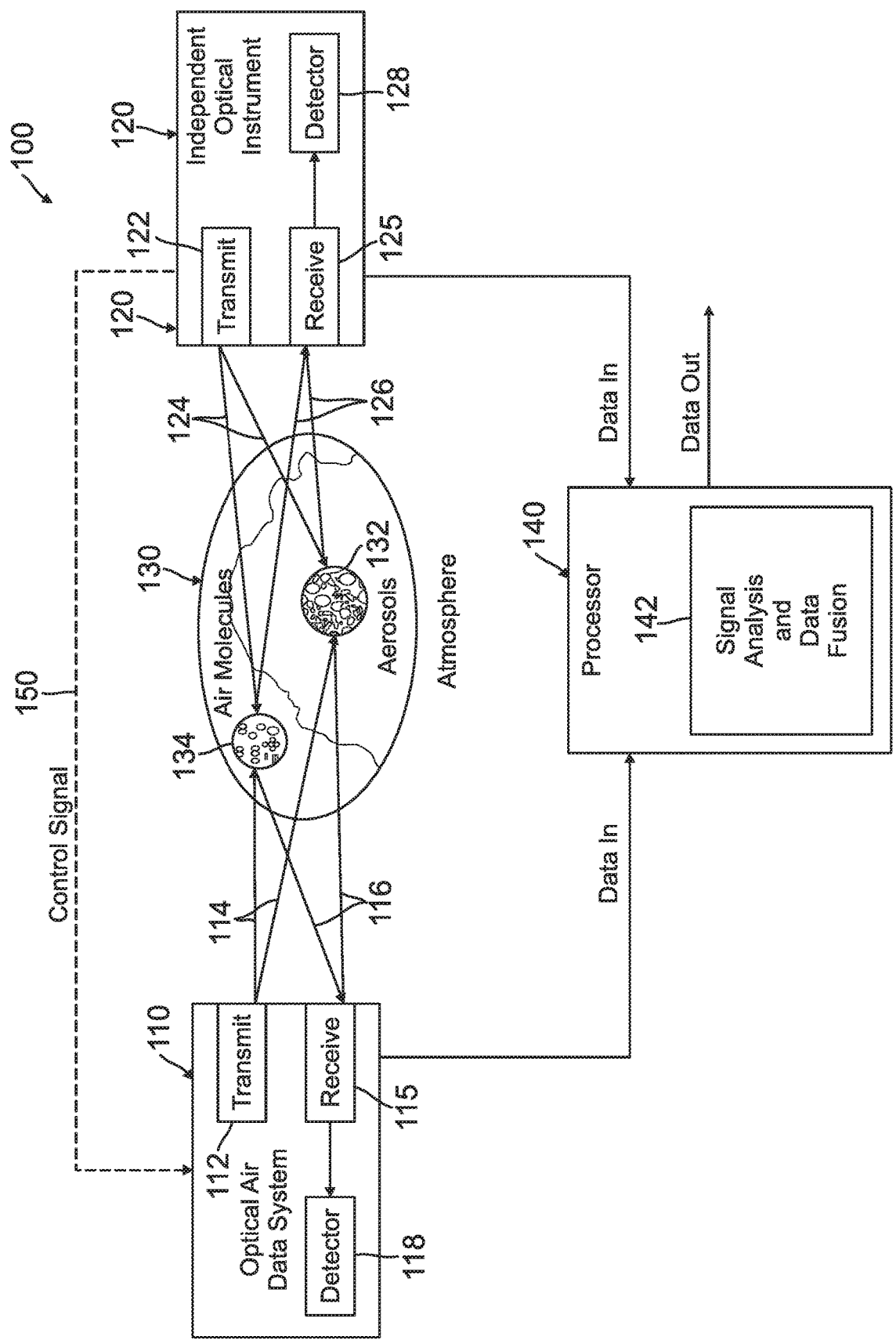
FIG. 1A is a block diagram of an optical air data fusion system, according to one embodiment.
Figure 1B:
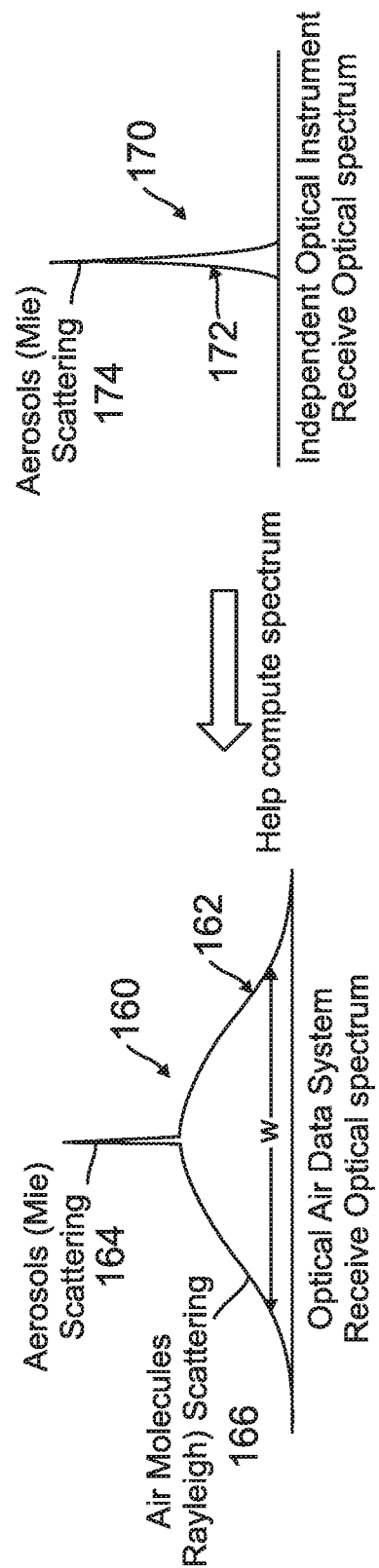
FIG. 1B depicts graphical representations of exemplary receive optical spectra generated by the air data fusion system of FIG. 1A.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Optical air data fusion systems and methods, which utilize remote atmospheric sensing, are described herein. The systems and methods are implemented to provide fusion of optical data from an optical air data system and an independent optical instrument. One or more data fusion algorithms can be used to improve the optical air data system computations.

The present approach leverages other optical instruments that remotely measure the whole, or a subset, of atmospheric constituents that are measured by an optical air data system, to improve performance of the air data system. In one implementation, fusion of data from two airborne remote atmospheric interrogation instruments are used that can measure atmospheric conditions by different mechanisms.

As described previously, it may be difficult to accurately extract air data parameters from a collected backscatter signal due to the numerous dependencies and degrees of freedom of the model fit for analyzing the air data. The present approach provides that a subset of such dependencies can be known or measured by another mechanism, which can reduce the degrees of freedom of the model fit. Reducing the degrees of freedom of the model fit can provide more robust air data parameters and higher reliability (fidelity to truth) in widely-varied optical backscatter conditions.

In one embodiment, an air data fusion system includes an optical air data system that relies on both aerosol and molecular scattering to measure air data parameters, and another independent optical remote sensing instrument that measures aerosols and/or air molecules. By using an independent optical remote sensing instrument to measure the content of aerosols and/or molecules in the relevant interrogation volume, one or more parameters of the optical air data system can be known, thus improving the fit model to the data.

In one example, an independent airborne remote sensing instrument mounted on an aircraft can measure the aerosol content of the atmosphere in an interrogation region by the aircraft. By knowing the aerosol content of the atmosphere, this information can be used to help an algorithm of an optical air data system, also mounted on the aircraft, to differentiate the portion of the total scattering from aerosols vs. molecular scattering.

In one operational method, by knowing the aerosol and/or molecular concentration, the aerosol vs. molecular scattering ratio can be calculated, and a data analysis algorithm can be tailored to optimize the remaining unknown parameters such as Doppler spectral shift.

In another operational method, by knowing the aerosol concentration or its presence, hardware settings (e.g., photodetector gains) in the air data system can be optimized dynamically to improve signal level and avoid system saturation. For example, different detector settings can be controlled to allow for operation of the air data system in higher or lower aerosol concentration regions.

In a further operational method, by knowing the aerosol and/or molecular concentration or its presence, the confidence level of an air data algorithm can be estimated, and the optical air data system health can be verified and output to an external user.

The present system provides various technical benefits, including decreasing degrees of freedom of a model fit for analyzing air data, thereby improving the model fit accuracy and air data output accuracy. The present approach can also provide system redundancy information that allows checks to be carried out. The present system can also provide controls to hardware and software settings to optimize operation (collection, processing, etc.) efficiency. The present approach can also provide input on system confidence level or reliability.

Other advantages of the present system include providing higher value to users through increased accuracy, reliability, and confidence level of the optical air data system. The present approach also make it easier to qualify for certification reliability requirements.

Further details of various embodiments are described hereafter with reference to the drawings.

FIG. 1A illustrates an optical air data fusion system 100, according to one embodiment. The system 100 includes an optical air data system 110 operative to measure aerosol and molecular scattering of light from an interrogation air region 130 in the atmosphere. The system 100 also includes an independent optical instrument 120 that provides remote sensing separate from air data system 110. As such, optical instrument 120 is operative to measure aerosol and/or molecular scattering of light from interrogation air region 130. At least one processor 140 is operative to receive data from air data system 110, and also to receive data from optical instrument 120. The processor 140 is operative to perform one or more signal analysis and data fusion methods 142, and to provide an enhanced data output, as described in further detail hereafter.

The air data system 110 comprises at least one light source, such as a laser transmitter 112, which is configured to transmit a light beam 114 into interrogation air region 130. A set of receive optics 115 in air data system 110 is configured to provide at least one receive channel. The receive optics 115 are configured to collect a scattered portion 116 of transmitted light beam 114 from one or more aerosols 132 and air molecules 134 in interrogation air region 130. In one embodiment, laser transmitter 112 and receive optics 115 can be implemented in an optical transceiver. An optical detector 118 in air data system 110 is in communication with the receive channel and is configured to receive the collected scattered portion 116. The optical detector 118 is operative to measure a signal intensity as a function of frequency from scattered portion 116, and convert this data to an electrical signal that is sent to processor 140 for analysis.

In one embodiment, air data system 110 is configured for use on a vehicle such as an aircraft. In this embodiment, air data system 110 comprises an optical air data sensor, including a laser transmitter and receive optics implemented in an optical transceiver, which has at least one line-of-sight that is fixed relative to the body axes of the vehicle. The optical air data sensor also includes the optical detector.

The optical instrument 120 comprises at least one light source, such as a laser transmitter 122, which is configured to transmit a light beam 124 into interrogation air region 130. A set of receive optics 125 is configured to provide at least one receive channel. The receive optics 125 are configured to collect a scattered portion 126 of transmitted light beam 124 from the one or more aerosols 132 and/or air molecules 134 in interrogation air region 130. In one embodiment, laser transmitter 122 and receive optics 125 can be implemented as part of an optical transceiver. An optical detector 128 is in communication with the receive channel and is configured to receive the collected scattered portion 126. The optical detector 128 is operative to convert the collected scatter data to an electrical signal that is sent to processor 140 for analysis.

In one embodiment, optical instrument 120 can be implemented in the form of a particle sensor assembly, which can be configured for use on a vehicle such as an airborne vehicle. The particle sensor assembly is operative to measure an aerosol scattering coefficient. In this case, optical detector 128 is operative to measure a signal intensity as a function of time from scattered portion 126. There are various other optical sensors currently available that utilize optical detection schemes for particles or aerosols. In another embodiment, optical instrument 120 can be implemented in the form of optical sensor operative to measure a molecular scattering coefficient.

Alternatively, optical instrument 120 can be implemented as a second air data system, including the features described above for air data system 110. For example, optical instrument 120 can be implemented using an optical air data sensor, with the laser transmitter and receive optics implemented in an optical transceiver. This optical air data sensor also includes the optical detector, as described above.

In some embodiments, air data system 110 and optical instrument 120 are located on the same vehicle. In other embodiments, air data system 110 and optical instrument 120 are located on different vehicles, but are operative to interrogate the same atmospheric region.

In further embodiments, air data system 110 is located on a vehicle, and optical instrument 120 is located on the ground to provide ground-based optical remote sensing. In these embodiments, air data system 110 (on vehicle) and optical instrument 120 (ground-based) are operative to interrogate the same atmospheric region.

In an alternative embodiment, optical instrument 120 can be optionally configured to send a control signal 150 to air data system 110, as shown in FIG. 1A. The control signal 150 is operative to control hardware and software settings in air data system 110 to optimize operational efficiency.

FIG. 1B depicts graphical representations of exemplary receive optical spectra generated by air data fusion system 100. In particular, FIG. 1B shows graphical representations of a receive optical spectrum 160 generated by optical air data system 110, and a receive optical spectrum 170 generated by independent optical instrument 120.

The receive optical spectrum 160 includes a backscatter line shape 162 produced by Rayleigh scattering from air molecules 134 in the atmosphere of interrogation air region 130, and by Mie scattering from aerosols 132 in the atmosphere. The Rayleigh scattering and Mie scattering both contribute to backscatter line shape. The backscatter line shape 162 includes the Mie scattered contribution in the form of a narrow aerosol peak 164, which protrudes from the Rayleigh scattered contribution in the form of a broadening base 166.

The receive optical spectrum 170 includes a backscatter line shape 172 produced by Mie scattering from the aerosols in the atmosphere. The backscatter line shape 172 includes the Mie scattered contribution in the form of an aerosol peak 174. The receive optical spectrum 170 generated by optical instrument 120 is used by processor 140 to help compute the receive optical spectrum 160 in air data system 110.

For example, aerosol peak 174 from optical instrument 120 can help to provide an enhanced signal analysis and data fusion, by taking what would otherwise be unconstrained fitting parameters in the air data system collected data, such as aerosol and molecular backscatter signal intensities, and have these parameters be constrained from the independent measurement of the aerosol backscatter signal strength from optical instrument 120. This allows the fitting of the data to mainly focus on the Doppler shifts in the detected spectra. Various air data parameters, such as air speed, angle of attack (AOA), angle of sideslip (AOS), temperature, pressure, and the like, can then be derived from optical spectrum 160 using standard processing techniques.

For example, air speed, which is related to the velocity of a moving vehicle, is derived from the Doppler shift between the center frequency of the backscattered signal and the laser frequency (discussed further below). Both air temperature and air pressure are convolved in the molecular linewidth of the backscattered spectrum (i.e., backscatter line shape 162). The width (w) of backscatter line shape 162 is dictated by the air temperature. The intensity (i.e., area under the curve of backscatter line shape 162) is dictated by the density, which is directly related to the air pressure. Typically, a model is used to fit and subsequently deduce the air data parameters from backscatter line shape 162.

The computed air data parameters are output from processor 140 to other systems, such as a vehicle computer for use in further vehicle data processing. For example, when the vehicle is an aircraft, processor 140 can send an estimated air speed to an avionics unit onboard the aircraft for further data processing.

Figure 2B:
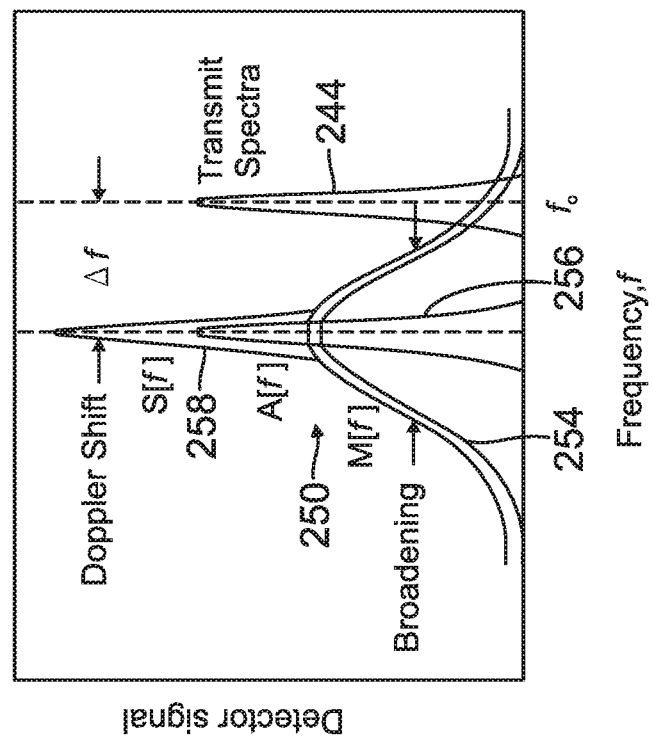
FIG. 2B is a plot showing an exemplary backscatter spectrum produced by the optical air data sensor of FIG. 2A.
Figure 2A:
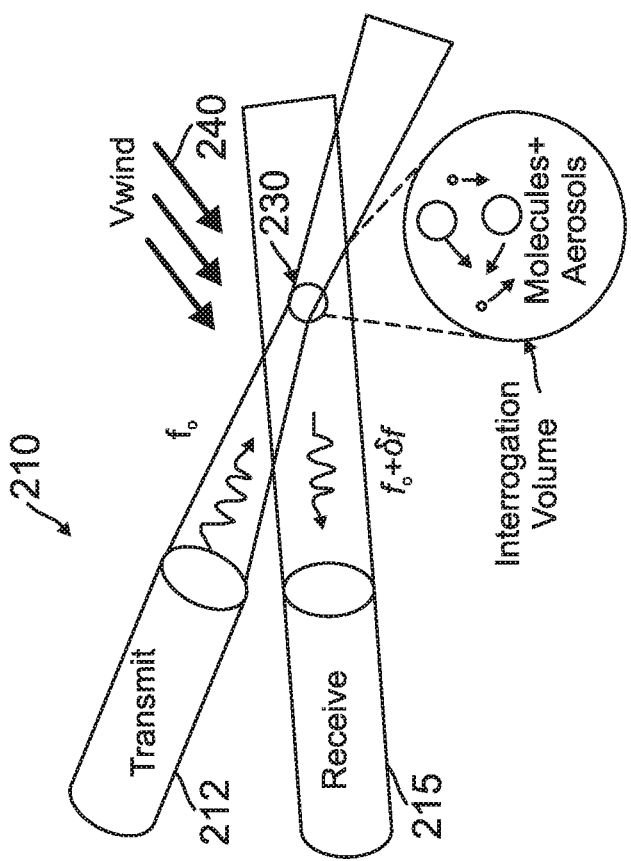
FIG. 2A is a schematic view of an optical air data sensor, which can be implemented as part of the air data fusion system of FIG. 1A.

FIG. 2A is a schematic view of an optical air data sensor 210, such as an incoherent hyperspectral (direct detection) sensor, which can be implemented as part of an optical air data system such as air data system 110 (FIG. 1A). The air data sensor 210 system 210 is designed to perform Doppler velocimetry from aerosol and molecular backscatter in an interrogation volume 230. The optical air data sensor 210 comprises a laser transmitter 212, which is configured to transmit a light beam with an optical frequency $f_0$ into interrogation volume 230. A receiver 215 is configured to receive backscatter light from interrogation volume 230, with the received backscatter light having frequency shift f (i.e., $f_0 + \delta_f$). In addition, FIG. 2A shows a direction 240 of wind into interrogation volume 230, with the wind have a velocity $v_{wind}$.

FIG. 2B is a plot showing an exemplary backscatter spectrum 250 produced by optical air data sensor 210, with the plot indicating the received molecular, aerosol, and total backscatter spectra shifted with respect to the transmit laser light. In particular, backscatter spectrum 250 is shifted with respect to a transmit spectra 244, and is distinguished by the contributions indicated by curve 254 and curve 256, which are the molecular and aerosol components, respectively. The combined signal that is measured by the system is shown by a curve 258.

The spectrum of the backscatter light $S[\delta f]$, where $\delta f \equiv f - f_0$ is the frequency shift of the received light f and the transmitter optical frequency $f_0$, centered at Doppler shift $\Delta f$, received by an optical air data system sensitive to aerosol (A) and molecular (M) scattering, may be given by the following expression:

$$S[f] = A[\Delta f, n_A, f] + M[\Delta f, n_M, f]$$

where $n_M$, $n_A$ are the molecular and aerosol scattering cross sections present in the atmosphere, respectively, and the variables in the square brackets represent function arguments.

In general, an incoherent hyperspectral system can measure air data parameters by fitting $S[f]$ with free fitting parameters $n_A$, $n_M$, and $\Delta f$. Some air data products are calculated from the molecular backscatter contribution M alone, including, but not limited to, air temperature and density. However, the aerosol backscatter contribution A may in some atmospheric conditions be larger or comparable to M. In such conditions where A is large, air data parameters originating from the molecular scattering signal alone may become more challenging to measure reliably because of the dominant signal A and its associated noise.

For example, air data parameters such as temperature and pressure are more sensitive to various types of aerosols, so that measuring temperature and pressure can be challenging in areas with a higher aerosol concentration. In addition, the higher aerosol concentration can reduce reliability of such temperature and pressure measurements.

The utility of the fusion technique described herein is the fixing of $n_A$ from a secondary data source, such as an independent optical instrument, such that the number of free fitting parameters is reduced and $n_M$, $\Delta f$ may be fitted with higher fidelity than if $n_A$ was a free fitting parameter. Alternatively, if $n_M$ or a linear combination of $n_A$ and $n_M$ is measured by the secondary data source, the same procedure can be used to improve the fit fidelity to the remaining unknown fitting parameters.

Figure 3:
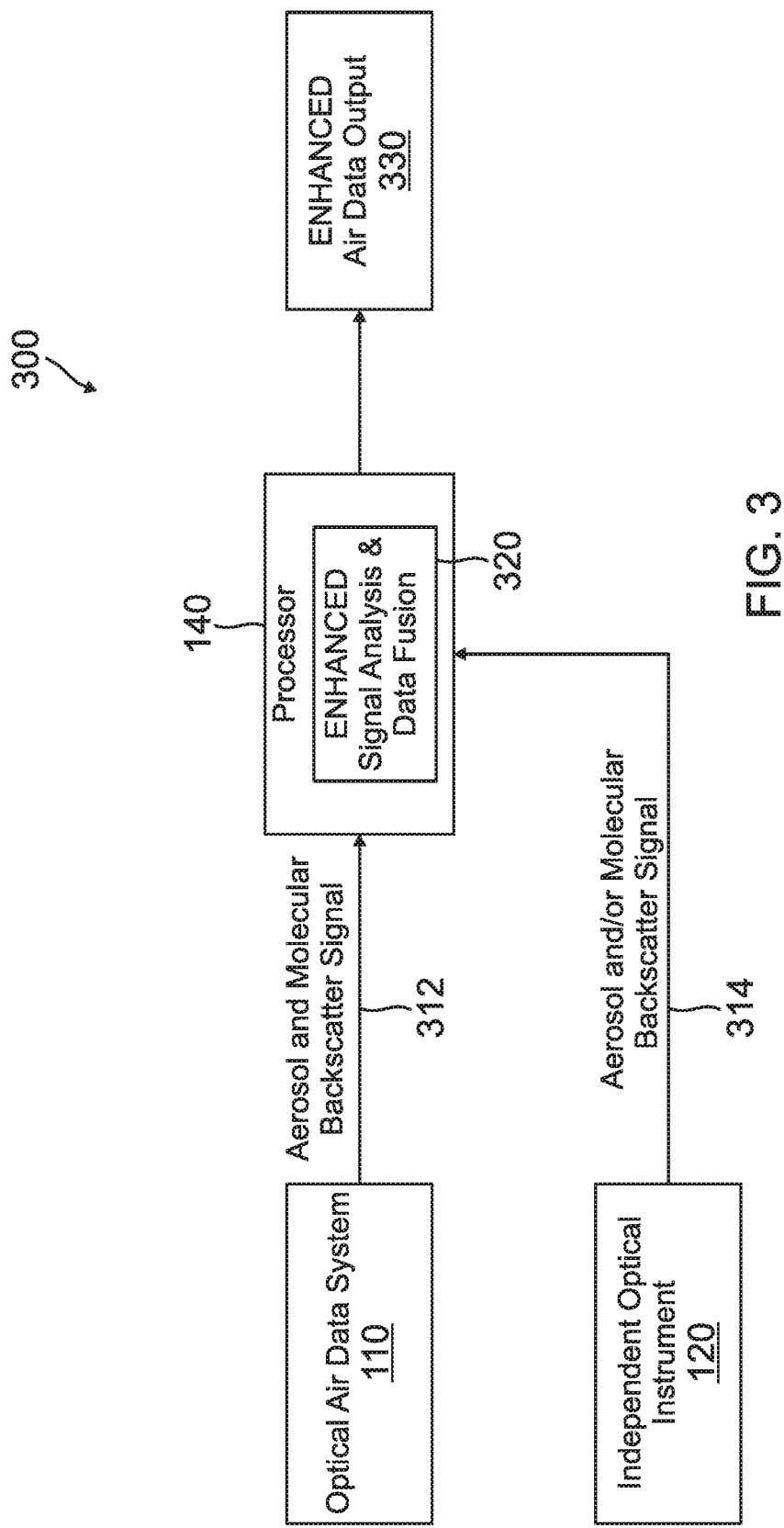
FIG. 3 is a block diagram of one exemplary system operation for an optical air data fusion system.

FIG. 3 is a block diagram of one exemplary system operation 300, for an optical air data fusion system, such as air data fusion system 100 (FIG. 1A). FIG. 3 illustrates how an independent optical instrument such as optical instrument 120, can enhance the signal analysis performance of an optical air data system such as air data system 110, according to one implementation. In this example, air data system 110 obtains an aerosol and molecular backscatter signal from the interrogation air region, and a corresponding data signal 312 is sent to a processor, such as processor 140. The optical instrument 120 obtains an aerosol and/or molecular backscatter signal from the interrogation air region, and a corresponding data signal 314 is sent to processor 140. The processor 140 performs an enhanced signal analysis and data fusion method 320 based on the received data, which is described further hereafter. The processor 140 then outputs enhanced air data 330, such as enhanced air data parameters, to one or more other systems for use in further data processing.

Figure 4:
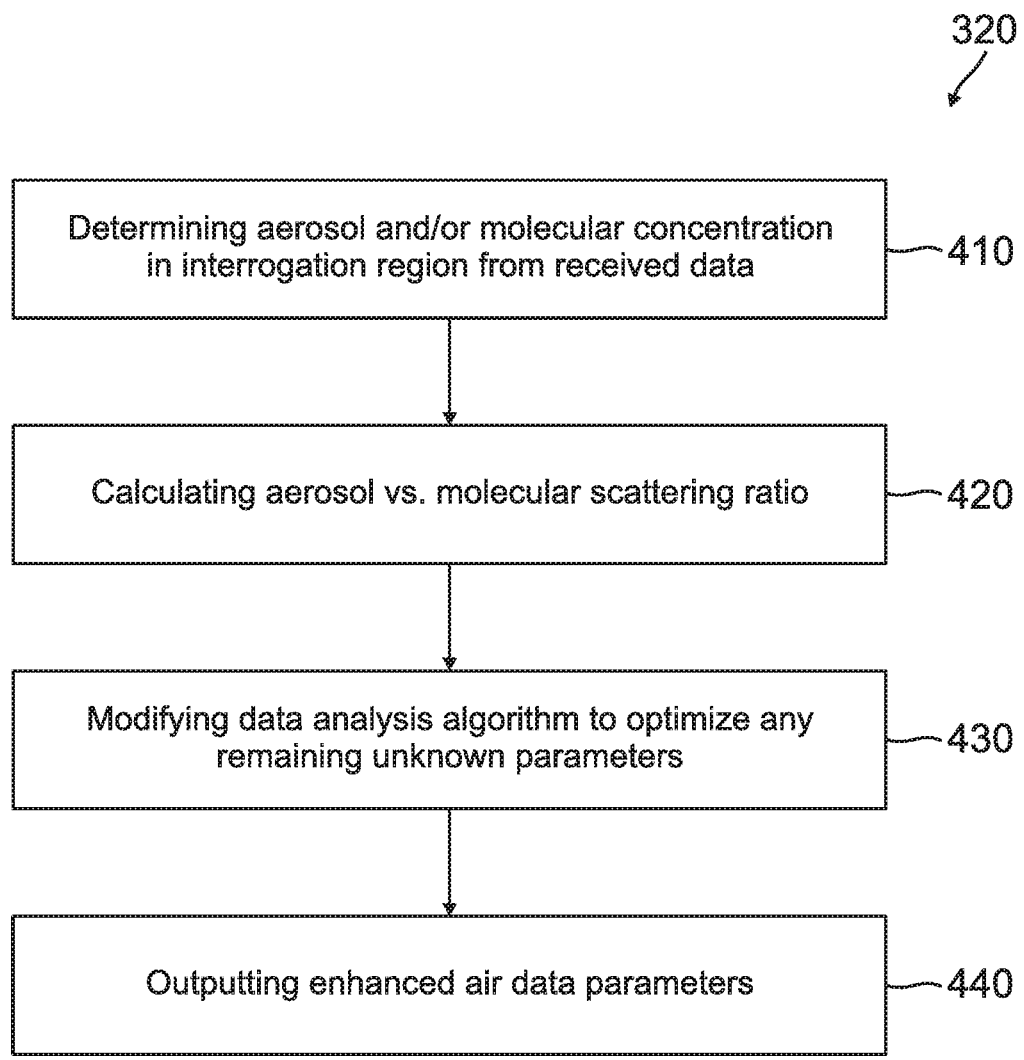
FIG. 4 is a flow diagram of one enhanced signal analysis and data fusion method, which can be performed by a processor in the exemplary system operation of FIG. 3.

FIG. 4 is a flow diagram of the enhanced signal analysis and data fusion method 320, which can be performed by the processor. The method 320 comprises determining an aerosol and/or molecular concentration in the interrogation air region from the received data signals (block 410). The method 320 can optionally calculate an aerosol verses molecular scattering ratio if needed (block 420). A data analysis algorithm is modified to optimize any remaining unknown parameters (block 430). The method 320 then outputs enhanced air data parameters (block 440).

Figure 5:
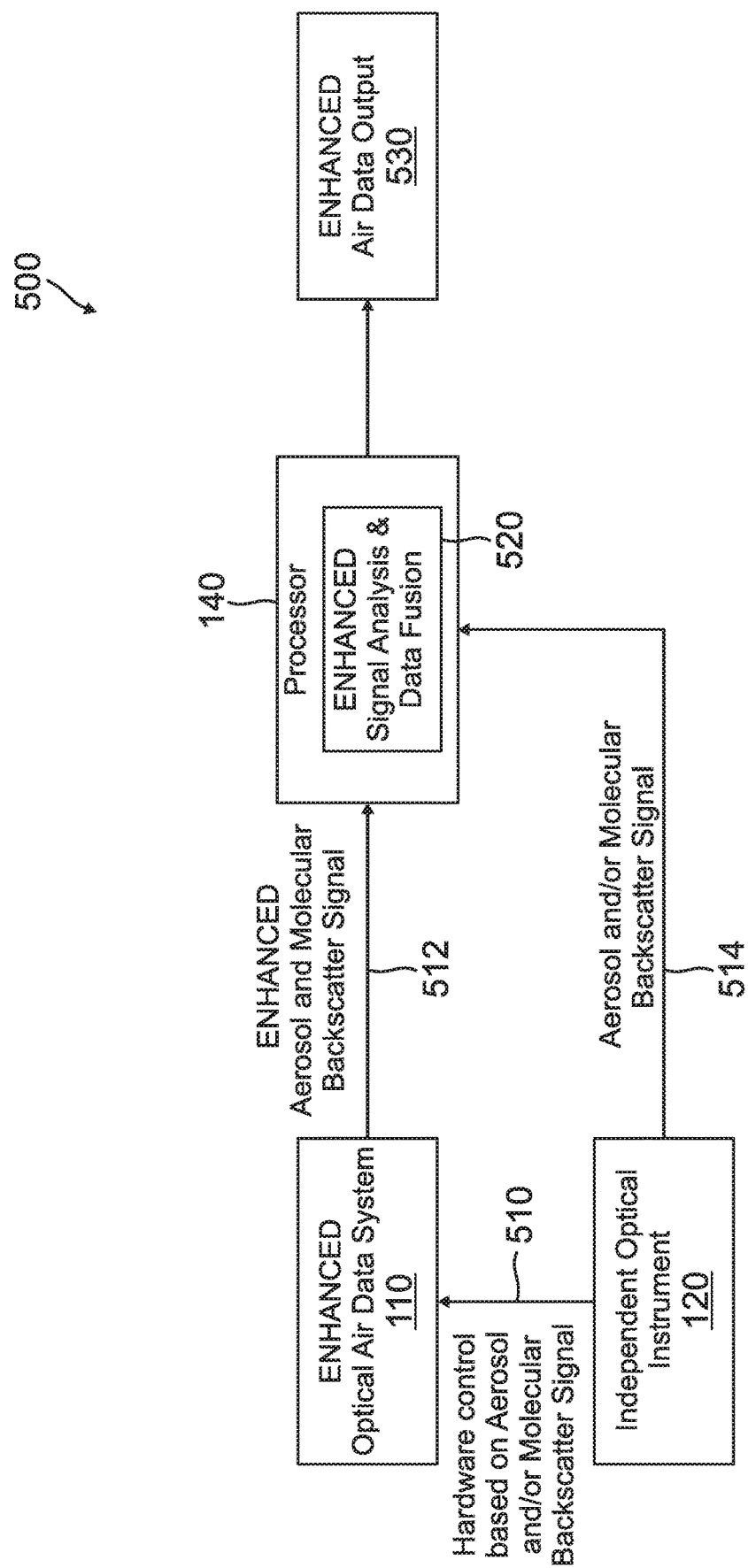
FIG. 5 is a block diagram of another exemplary system operation for an optical air data fusion system.

FIG. 5 is a block diagram of another exemplary system operation 500, for an optical air data fusion system, such as air data fusion system 100 (FIG. 1A). FIG. 5 illustrates how an independent optical instrument such as optical instrument 120, can assist in the hardware settings and/or enhance the signal analysis performance of an optical air data system to provide an enhanced air data system 110, according to another implementation. In this example, air data system 110 obtains an aerosol and molecular backscatter signal from the interrogation air region, and optical instrument 120 obtains an aerosol and/or molecular backscatter signal from the interrogation air region. In addition, optical instrument 120 generates a hardware control signal 510 based on the aerosol and/or molecular backscatter signal. The hardware control signal 510 is sent to air data system 110 to aid in generating an enhanced aerosol and molecular backscatter signal, and a corresponding enhanced data signal 512 is sent to processor 140 from air data system 110.

A data signal 514 corresponding to the obtained aerosol and/or molecular backscatter signal can also be sent from optical instrument 120 to processor 140. The processor 140 then performs an enhanced signal analysis and data fusion method 520 based on the received data, which is described further hereafter. The processor 140 then outputs enhanced air data 530, such as enhanced air data parameters, to one or more other systems for use in further data processing.

Figure 6:
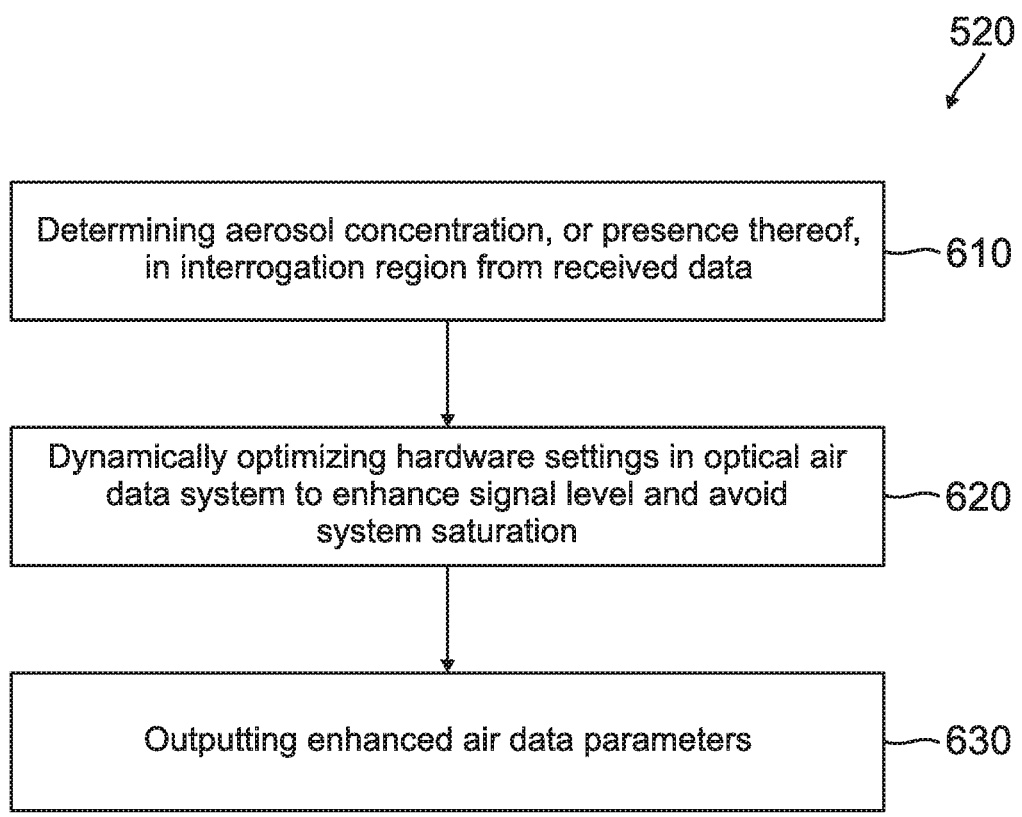
FIG. 6 is a flow diagram of another enhanced signal analysis and data fusion method, which can be performed by a processor in the exemplary system operation of FIG. 5.

FIG. 6 is a flow diagram of the enhanced signal analysis and data fusion method 520, which can be performed by the processor. The method 520 comprises determining an aerosol concentration, or presence thereof, in the interrogation region from the received data (block 610). The method 520 dynamically optimizes the hardware settings in the optical air data system to enhance a signal level and avoid system saturation (block 620). The method 520 then outputs enhanced air data parameters.

Figure 7:
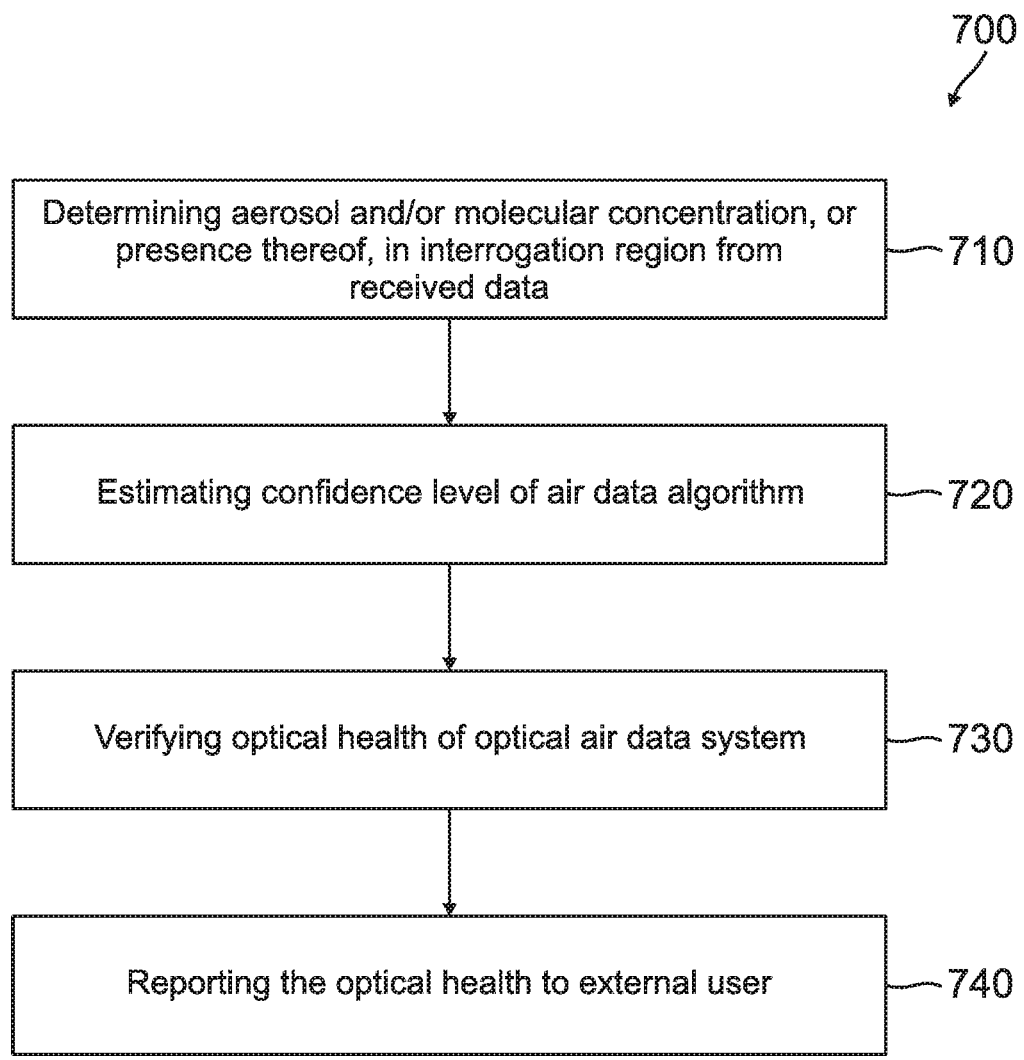
FIG. 7 is a flow diagram of a further method for providing enhanced signal analysis and data fusion, which can be performed by a processor in an optical air data fusion system.

FIG. 7 is a flow diagram of another method 700 for providing enhanced signal analysis and data fusion, which can be performed by the processor. The method 700 comprises determining an aerosol and/or molecular concentration, or presence thereof, in the interrogation region from the received data (block 710). The method 700 then estimates a confidence level of an air data algorithm in the processor (block 720). The method 700 verifies the optical health of the optical air data system (block 730), and reports the optical health to an external user (block 740).

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system comprising: an optical air data system operative to measure aerosol and molecular scattering of light from an interrogation region; an optical instrument separate from the optical air data system, the optical instrument operative to measure aerosol and/or molecular scattering of light from the interrogation region; and a processor operative to receive data from the optical air data system and data from the optical instrument, wherein the processor is configured to perform one or methods comprising: (a) a first signal analysis and data fusion method, comprising: determining an aerosol and/or molecular concentration in the interrogation region from the received data; modifying a data analysis algorithm to optimize any remaining unknown parameters; and outputting enhanced air data parameters; (b) a second signal analysis and data fusion method, comprising: determining an aerosol concentration, or presence thereof, in the interrogation region from the received data; dynamically optimizing hardware settings in the optical air data system to enhance a signal level and avoid system saturation; and outputting enhanced air data parameters; or (c) a third signal analysis and data fusion method, comprising: determining an aerosol and/or molecular concentration, or presence thereof, in the interrogation region from the received data; estimating a confidence level of an air data algorithm in the processor; verifying optical health of the optical air data system; and reporting the optical health to an external user.

Example 2 includes the system of Example 1, wherein the optical air data system comprises: a first light source configured to transmit a first light beam into the interrogation air region; a first set of receive optics providing a first receive channel, the first set of receive optics configured to collect a first scattered portion of the transmitted first light beam from one or more aerosols and air molecules in the interrogation air region; and a first optical detector in communication with the first receive channel and configured to receive the collected first scattered portion, the first optical detector operative convert the first scattered portion to a first data signal that is sent to the processor for analysis.

Example 3 includes the system of Example 2, wherein the first light source comprises a first laser transmitter.

Example 4 includes the system of Example 3, wherein the first laser transmitter and the first set of receive optics are implemented in a first optical transceiver.

Example 5 includes the system of any of Examples 1-4, wherein the optical air data system comprises an incoherent hyperspectral system.

Example 6 includes the system of any of Examples 2-5, wherein the optical instrument comprises: a second light source configured to transmit a second light beam into the interrogation air region; a second set of receive optics providing a second receive channel, the second set of receive optics configured to collect a second scattered portion of the transmitted second light beam from one or more aerosols and/or air molecules in the interrogation air region; and a second optical detector in communication with the second receive channel and configured to receive the collected second scattered portion, the second optical detector operative convert the second scattered portion to a second data signal that is sent to the processor for analysis.

Example 7 includes the system of Example 6, wherein the second light source comprises a second laser transmitter.

Example 8 includes the system of Example 7, wherein the second laser transmitter and the second set of receive optics are implemented in a second optical transceiver.

Example 9 includes the system of any of Examples 1-5, wherein the optical instrument comprises a particle sensor assembly.

Example 10 includes the system of Example 9, wherein the particle sensor assembly is operative to measure an aerosol scattering coefficient.

Example 11 includes the system of any of Examples 1-8, wherein the optical instrument comprises an optical sensor operative to measure a molecular scattering coefficient.

Example 12 includes the system of any of Examples 1-11, wherein: the optical air data system and the optical instrument are mounted on one or more vehicles; or the optical air data system is mounted on a vehicle, and the optical instrument is ground-based.

Example 13 includes the system of Example 12, wherein the one or more vehicles include aircraft.

Example 14 includes the system of any of Examples 1-13, wherein the optical instrument is configured to send a control signal to the air data system, the control signal operative to control hardware and software settings in the optical air data system to optimize operational efficiency.

Example 15 includes a method comprising: obtaining a first backscatter signal, from one or more aerosols and air molecules in an interrogation air region, using an optical air data system that generates a first data signal corresponding to the first backscatter signal; sending the first data signal to a processor; obtaining a second backscatter signal, from one or more aerosols and/or air molecules in the interrogation air region, using an optical instrument that generates a second data signal corresponding to the second backscatter signal; sending the second data signal to the processor; performing an enhanced signal analysis and data fusion method in the processor based on the first and second data signals; and outputting one or more enhanced air data parameters from the processor.

Example 16 includes the method of Example 15, wherein the enhanced signal analysis and data fusion method comprises: determining an aerosol and/or molecular concentration in the interrogation region from the first and second data signals; and modifying a data analysis algorithm to optimize any remaining unknown parameters.

Example 17 includes the method of any of Examples 15-16, wherein the enhanced signal analysis and data fusion method comprises: determining an aerosol concentration, or presence thereof, in the interrogation region from the first and second data signals; and dynamically optimizing hardware settings in the optical air data system, to enhance a signal level and avoid system saturation, based on a control signal from the optical instrument.

Example 18 includes the method of any of Examples 15-17, wherein the enhanced signal analysis and data fusion method comprises: determining an aerosol and/or molecular concentration, or presence thereof, in the interrogation region from the first and second data signals; estimating a confidence level of an air data algorithm in the processor; verifying optical health of the optical air data system; and reporting the optical health to an external user.

Example 19 includes the method of any of Examples 15-18, wherein the optical air data system and the optical instrument are mounted on one or more vehicles.

Example 20 includes the method of any of Examples 15-18, wherein the optical air data system is mounted on a vehicle, and the optical instrument is ground-based.

The present invention may be embodied in other specific forms without departing from its essential characteristics. The described embodiments are to be considered as illustrative and not restrictive. The scope of the invention is therefore indicated by the appended claims rather than by the foregoing description. Any changes that come within the meaning and range of equivalency of the claims are to be embraced within their scope.

What is claimed is:

1. A system comprising:
   an optical air data system operative to measure aerosol and molecular scattering of light from an interrogation region using a first optical detector;
   an optical instrument separate from the optical air data system, the optical instrument operative to measure aerosol and/or molecular scattering of light from the interrogation region using a second optical detector;
   wherein the first optical detector and the second optical detector have overlapping fields of view of the interrogation region; and
   a processor operative to receive data from the optical air data system and data from the optical instrument, wherein the processor is configured to perform a signal analysis and data fusion method, comprising:
   determining an aerosol concentration, or presence thereof, in the interrogation region from the received data from the optical air data system and the optical instrument;
   dynamically optimizing detector settings in the optical air data system by modulating the detector settings to enhance a signal level and avoid system saturation; and
   outputting enhanced air data parameters.

2. The system of claim 1, wherein the optical air data system further comprises:
   a first light source configured to transmit a first light beam into the interrogation air region; and
   a first set of receive optics providing a first receive channel, the first set of receive optics configured to collect a first scattered portion of the transmitted first light beam from one or more aerosols and air molecules in the interrogation air region;
   wherein the first optical detector is in communication with the first receive channel and configured to receive the collected first scattered portion, the first optical detector operative convert the first scattered portion to a first data signal that is sent to the processor for analysis.

3. The system of claim 2, wherein the first light source comprises a first laser transmitter.

4. The system of claim 3, wherein the first laser transmitter and the first set of receive optics are implemented in a first optical transceiver.

5. The system of claim 2, wherein the optical instrument further comprises:
a second light source configured to transmit a second light beam into the interrogation air region; and
a second set of receive optics providing a second receive channel, the second set of receive optics configured to collect a second scattered portion of the transmitted second light beam from one or more aerosols and/or air molecules in the interrogation air region;
wherein the second optical detector is in communication with the second receive channel and configured to receive the collected second scattered portion, the second optical detector operative convert the second scattered portion to a second data signal that is sent to the processor for analysis.

6. The system of claim 5, wherein the second light source comprises a second laser transmitter.

7. The system of claim 6, wherein the second laser transmitter and the second set of receive optics are implemented in a second optical transceiver.

8. The system of claim 1, wherein the optical air data system comprises an incoherent hyperspectral system.

9. The system of claim 1, wherein the optical instrument comprises a particle sensor assembly.

10. The system of claim 9, wherein the particle sensor assembly is operative to measure an aerosol scattering coefficient.

11. The system of claim 1, wherein the optical instrument comprises an optical sensor operative to measure a molecular scattering coefficient.

12. The system of claim 1, wherein:
the optical air data system and the optical instrument are mounted on one or more vehicles; or
the optical air data system is mounted on a vehicle, and the optical instrument is ground-based.

13. The system of claim 12, wherein the one or more vehicles include aircraft.

14. The system of claim 1, wherein the optical instrument is configured to send a control signal to the air data system, the control signal operative to control hardware and software settings in the optical air data system to enhance operational efficiency.

15. A method comprising:
obtaining a first backscatter signal, from one or more aerosols and air molecules in an interrogation region, using an optical air data system that generates a first data signal corresponding to the first backscatter signal;
obtaining a second backscatter signal, from one or more aerosols and/or air molecules in the interrogation air region, using an optical instrument that generates a second data signal corresponding to the second backscatter signal;
wherein the optical air data system and the optical instrument have overlapping detector fields of view of the interrogation region;
sending the first data signal to a processor;
sending the second data signal to the processor;
performing a signal analysis and data fusion method in the processor based on the first and second data signals, wherein the signal analysis and data fusion method comprises:
determining an aerosol concentration, or presence thereof, in the interrogation region from the first and second data signals; and
dynamically optimizing detector settings in the optical air data system by modulating the detector settings to enhance a signal level and avoid system saturation; and
outputting one or more enhanced air data parameters from the processor.

16. The method of claim 15, wherein dynamically optimizing detector settings in the optical air data system by modulating the detector settings to enhance a signal level and avoid system saturation, is based on a control signal from the optical instrument that dynamically optimizes photodetector gains.

17. The method of claim 15, wherein the signal analysis and data fusion method further comprises:
determining an aerosol and/or molecular concentration, or presence thereof, in the interrogation region from the first and second data signals;
estimating a confidence level of an air data algorithm in the processor;
verifying optical health of the optical air data system; and
reporting the optical health to an external user.

18. The method of claim 15, wherein the optical air data system and the optical instrument are mounted on one or more vehicles.

19. The method of claim 15, wherein the optical air data system is mounted on a vehicle, and the optical instrument is ground-based.

* * * * *